RACK UNIT

Original Filed May 11, 1961 4 Sheets-Sheet 1

INVENTORS:
Morris Kaufman
Carl F. Luders
By
Atty

RACK UNIT

Original Filed May 11, 1961 4 Sheets-Sheet 2

INVENTORS:
Morris Kaufman
Carl F. Luders
By
Robert D. Tricket Atty

RACK UNIT

Original Filed May 11, 1961 4 Sheets-Sheet 3

INVENTORS:
Morris Kaufman
Carl F. Luders
By
Robert D. Tuttle
Atty

RACK UNIT

Original Filed May 11, 1961

INVENTORS:
Morris Kaufman
By Carl F. Luders
Robert W. Fisher Atty

United States Patent Office

Re. 25,912
Reissued Nov. 23, 1965

25,912
RACK UNIT

Morris Kaufman, Morton Grove, Ill., and Carl F. Luders, Cape Coral, Fla., assignors to Ekco Products Company, Chicago, Ill., a corporation of Delaware Original No. 3,112,034, dated Nov. 26, 1963, Ser. No. 109,424, May 11, 1961. Application for reissue Apr. 17, 1964, Ser. No. 372,732
6 Claims. (Cl. 211—148)

Matter enclosed in heavy brackets [ ] appears in the original patent but forms no part of this reissue specification; matter printed in italics indicates the additions made by reissue.

The present invention relates to a rack unit for handling and storing articles in organized, spaced apart relation and more particularly a rack unit which includes front and rear spaced parallel upright frame elements defining an open ended clearway between said frame elements and a series of vertically spaced horizontally extending guide rails secured to the clearway side of said frame elements for slidably supporting containers in said clearway according to the storage requirements and space allocations of the rack unit.

The rack unit embodying this invention is provided with features of design and construction which makes it economical in structure and cost of manufactures and incorporating interconnecting means which makes it possible for the unit to be stored and shipped to its point of use prior to assembly and to be set up and placed in operative assembly at the point of use in a convenient manner, without requiring special tools or equipment for completing installation.

It is also an object of this invention to provide a rack unit having sturdy and durable components designed to insure accurate installation and long, satisfying operation.

The foregoing and other objects of the invention, which will be set forth hereinafter or will be apparent to one skilled in the art upon reading these specifications, is accomplished by that construction and arrangement of parts which are hereinafter described as an exemplary embodiment.

Reference is made to the accompanying drawings, wherein.

Figure 1:
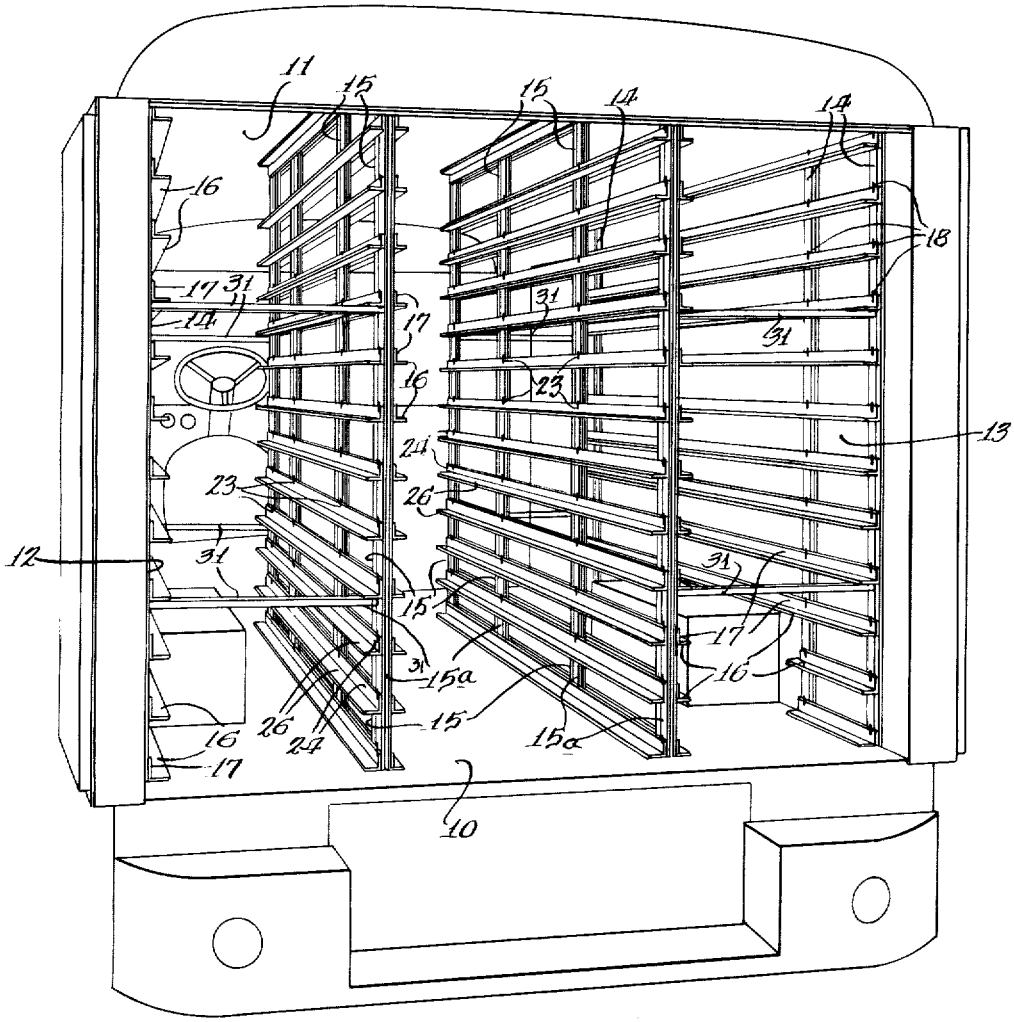
FIG. 1 is a perspective view illustrating the interior of a vehicle body equipped with a rack unit embodying the present invention.
Figure 2:
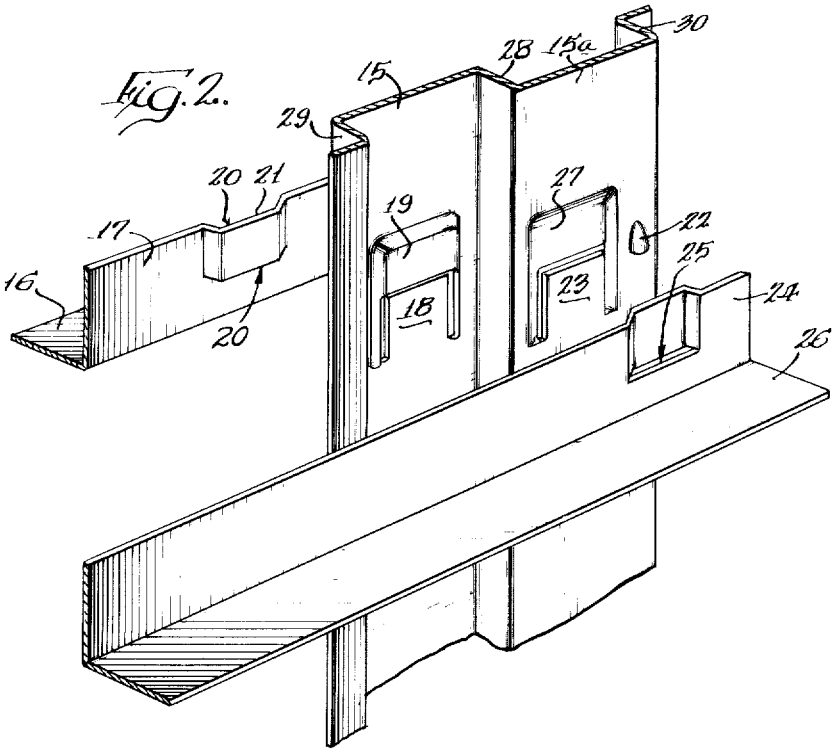
FIG. 2 is an exploded perspective view of an upright rack frame element and guide rails preparatory of establishing interconnection of the latter to said frame element.
Figure 3:
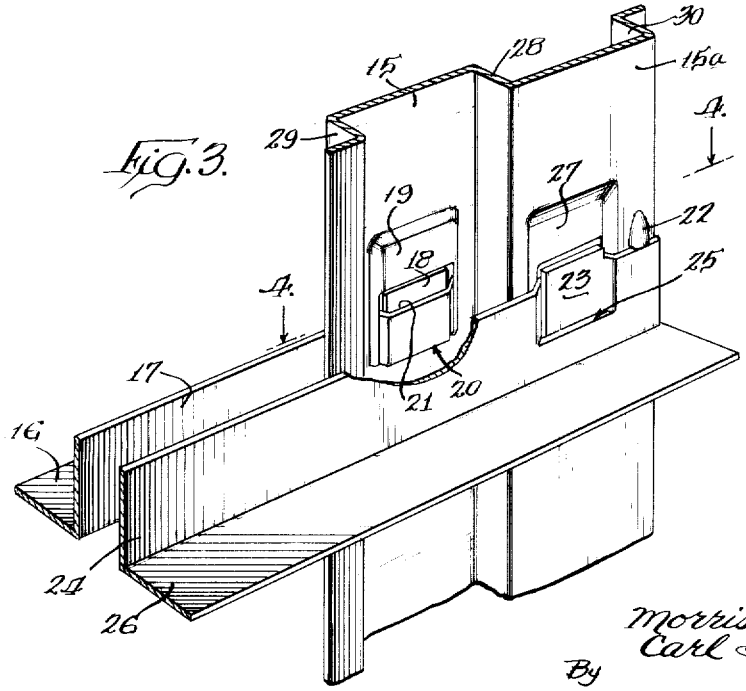
FIG. 3 is a similar view showing the frame element and guide rails in operatively interconnected relation.

To illustrate one practical embodiment of the present invention, the accompanying drawings show a pair of similar storage rack units arranged along the opposite sides of the through aisle of a motor truck having a floor 10, a roof 11, side walls 12 and 13 rising upwardly from opposite limits of said floor along substantially parallel planes extending lengthwise of the line of travel of the vehicle. Thus a description of one of these rack units will apply to both of said rack units.

Reference numeral 14 designates a series of upright supports rigidly secured by suitable means to the inwardly facing side of wall 13 of the vehicle, with the supports 14 in suitably spaced apart relation lengthwise of said walls. Reference numeral 15 designates a series of upright supports rigidly secured by suitable means to the floor 10 and the roof 11 of the vehicle, with the supports 15 arranged in spaced apart relation along a plane in spaced parallel relation to the row of supports 14. The supports 14 and 15 thus provide opposed front and rear skeleton frame elements defining a clearway space therebetween to which access is obtainable at either end of the area between said supports 14 and 15, as well as along the area in front of the supports 15.

The upright supports 14 and 15 each have a series of upwardly extending hooks 18 lanced from the body thereof and the material of the supports bordering the area vacated by each hook 18 is offset in a direction to define a recess 19 facing toward the clearway. The hooks 18 on each support are spaced apart at distances matching the spacing of the hooks 18 on the other supports. Thus the supports 14 and 15 present a series of horizontally aligned hooks 18 at several levels according to the desired number of horizontal divisions for a selected installation.

The rack unit of this invention contemplates a series of vertically spaced pairs of horizontal guideways on which trays or receptacles for holding a plurality of retail size packages, such for example as baked goods, may be supported for sliding movement lengthwise of the clearway between the upright supports 14 and 15. As shown in FIG. 1, such horizontally extending guideways comprise a series of rails each of generally L-shaped cross-sectional contour having a horizontal wing 16 and a wing 17 extending upwardly therefrom along the edge thereof facing away from the clearway, and of a length coextensive with the length of said clearway.

In accordance with the present invention, a speical form of interlocking joint is provided to establish rigid securement of the guideway rails to the upright supports 14 and 15 and at the same time provide an interconnection which can be quickly and easily completed without requiring special tools.

Figure 7:
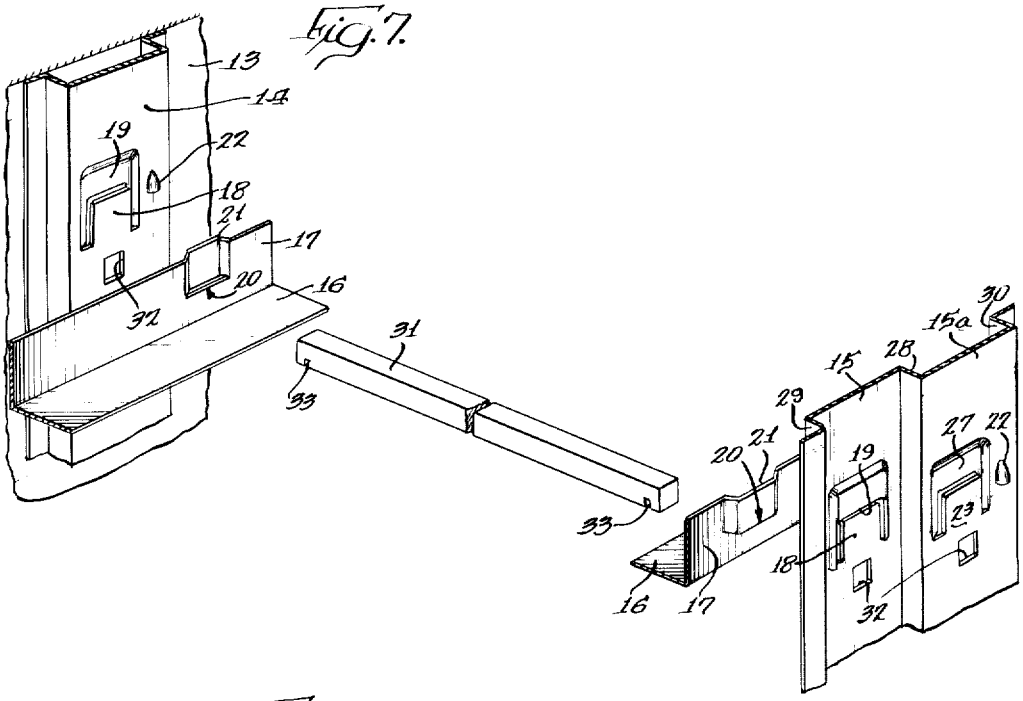
FIG. 7 is an exploded perspective view showing the upright frame elements at opposite sides of the clearway, preparatory to establishing interconnection of the guide rails to said frame elements and interconnection of said frame elements each to the other by bridging members cooperating therewith.
Figure 8:
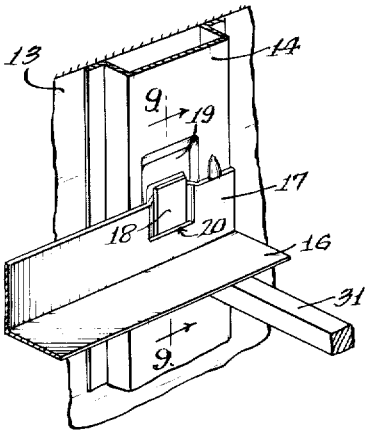
FIG. 8 is a perspective view showing one of said upright frame elements and said guide rail and bridging member in operatively connected relation.
Figure 9:
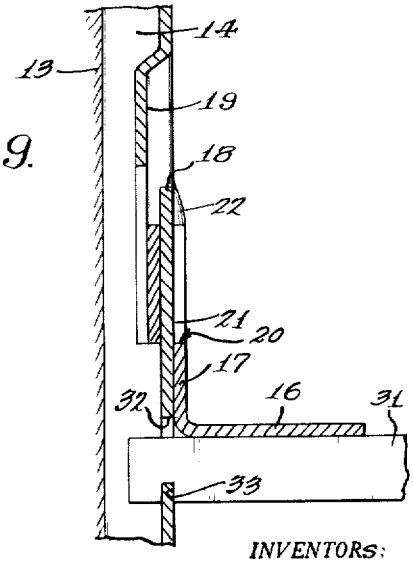
FIG. 9 is an enlarged fragmentary vertical section taken along line 9—9 of FIG. 8.

As shown in FIGS. 2 to 6 inclusive, the interconnection of the guideway rails to the upright supports is illustrated as applied to the side of supports 15 facing away from the clearway between supports 14 and 15. FIGS. 7 to 9 inclusive show a corresponding detailed disclosure of the interconnection of the guideway rails to the supports 14.

Figure 4:
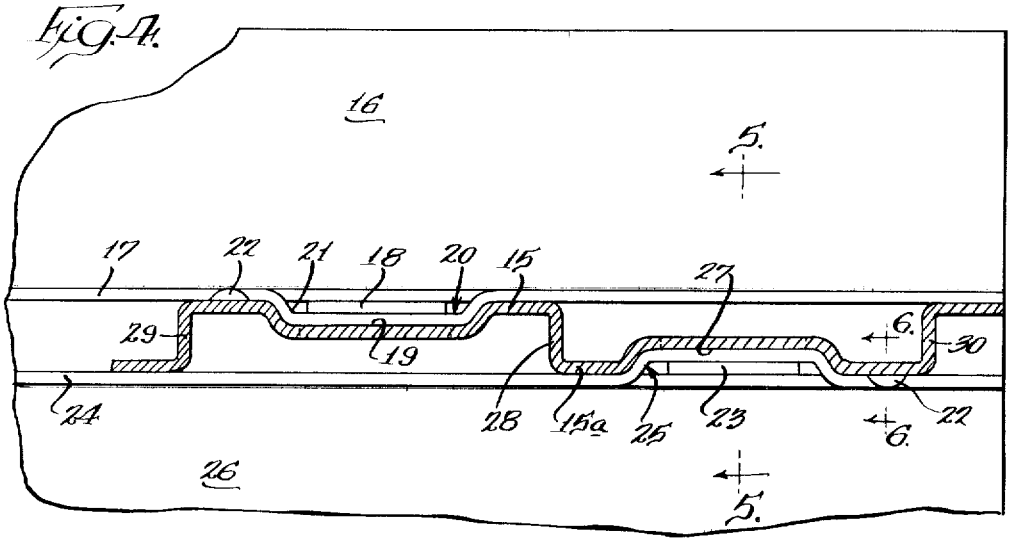
FIG. 4 is a horizontal section taken along line 4—4 of FIG. 3.
Figure 5:
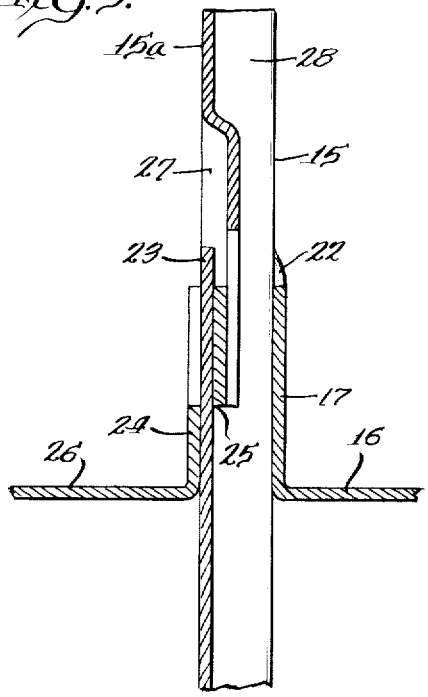
FIG. 5 is a vertical section taken along line 5—5 of FIG. 4.
Figure 6:
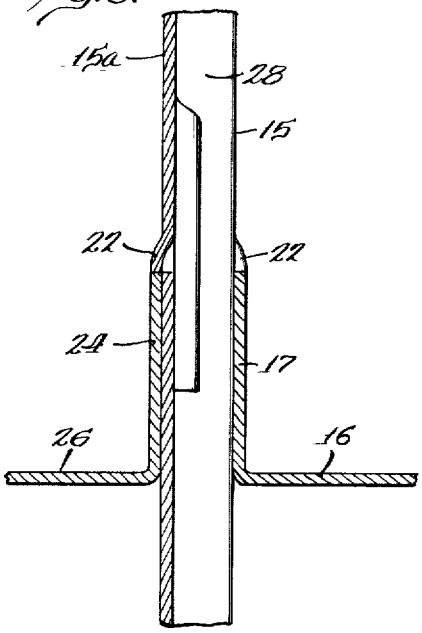
FIG. 6 is a vertical section taken along line 6—6 of FIG. 4.

The upwardly extending wing 17 of the guide rails with which the supports 14 and 15 cooperate, as shown in the drawings, have openings 20 formed therein at distances apart conforming to the horizontal spacing of the supoprts so that a selected set of horizontally aligned upwardly projecting hooks 18 on the supports are accepted in said openings 20 to establish an operative interconnection between the supports and the guide rails associated therewith. Each hook 18 is preferably lanced from the body of the support. It will be noted that the area of the guide bar extending upwardly from each opening 20 is offset in a direction to define a pocket 21 complementary to the hook 18 accepted by said opening whereby clearance is provided as needed to maintain the hook 18 inside the confines of a plane flush with the surface of the wing facing inwardly of the clearway as shown in FIG. 4. Thus the hook 18 is not allowed to obstruct the path of containers or trays slidably carried by the guide bar. As shown, the recesses 19 extends a distance above the hook 18 sufficient to assure ample room for lowering the guide bar into an operative position relative to the hook 18 without interference between clearway facing surface of the support and the offset surface of the guide bar above the opening for receiving said hook 18. The upper edge of the wing 17 of each guide bar is downwardly engaged by a projection 22 formed integrally with the supports 14 and 15 to prevent relative upward movement of the guide bar from an operatively connected condition relative to the supports.

It will therefore be understood that the rack unit of this invention features an interconnection of upright supports and guide bars which renders it relatively simple and easy to erect at the place of installation.

In the construction illustrated, in FIGS. 2 to 6 inclusive, the supports 15 differ from the supports 14 in that the former each have a second row of upwardly extending hooks 23 in parallel relation to the hooks 18, said hooks 23 being formed in an integral wing portion 15*a* extending the full length of the support 15 and offset in a direction away from the clearway between the supports 14 and 15 with the hooks 23 facing frontward of the wing portions 15*a*. The hooks 23 on the wing portions 15*a* at opposite sides of the aisle in front of said supports accordingly present horizontally aligned interconnection means for cooperation with supplementary guide rails having wings 24 provided with openings 25 corresponding to the openings 20 provided in the wings 17 of the guide rails along the clearway side of the uprights 14 and 15. The supplementary guide rails, via horizontal wings 26 extending frontward of the wings 24, present aisleway facing guides for slideably supporting containers or trays in the same manner that the guide rails on the clearway side of the supports 14 and 15 provide such guides. It will be noted that the wings 15*a* of the supports 15 have recesses 27 defined by indented areas above and along opposite sides of the area vacated by the hooks 23 in the same manner as recesses 19 associated with the hooks 18 and that the area of the wing 24 extending upwardly from each opening 25 is offset to define a pocket complementary to the recess 27 associated with the hook 23 accepted by said opening 25. The indentations along the wing 15*a* do not interfere with the indentations defining the recesses 19 by virtue of the offset relationship of the wing 15*a* and the area of the support 15 containing the hooks 18.

In practice, the upright supports 15 are formed to the approximate cross-section shown whereby wing 15*a* and the area of the support 15 are of equal dimension measured horizontally of the completed rack unit and divided by a shoulder 28, while opposite longitudinal edges of the upright 15 are provided with angular flanges 29 and 30 respectively. This construction provides for reinforcement and strengthening of the uprights 15 and thereby assure that the rack will be able to absorb strains of the weight carried thereby when all the guide rails are in fully loaded condition.

The supports 14 and 15 are joined by transverse rods 31 to provide additional resistance to distortion of the rack frame under severe stresses encountered while the vehicle is in transit. As shown in FIGS. 7, 8 and 9, the rod 31 is of multi-sided contour having entry to openings 32 in selected portions of the supports 14 and 15. In order to fix the rods 31 against movement relative to the supports lengthwise of the rods 31, each rod is provided with a downwardly open notch 33 in which the support has engagement along an edge portion at the lower limits of the opening 32 containing such rod. While the openings 32 in the supports are of sufficient vertical dimension to freely admit the rod 31 thereto incident to application or withdrawal of the rod therefrom, the rod 31 is so positioned, when fully seated in the opening 32, as to have upward engagement with the underside of a horizontally extending wing of the guide rail opposite thereto and thereby locked against withdrawal from a fully seated position.

A rack unit embodying the features of this invention, as hereinbefore described, accordingly provides an assembly which is capable of being put together and taken apart without the use of special tools and yet provides a strong and rigid structure capable of withstanding heavy loads and vibration incident to operation of a vehicle while in transit.

What is claimed is:

1. In a merchandise storage rack assembly, front and rear skeleton frame elements arranged in spaced apart parallel relation to provide an open ended clearway therebetween, each frame element including fixed upright supports spaced apart along lines at opposite sides of said clearway, a series of guide rails coextensive in length to the length of said clearway, and a series of connections operatively securing said rails on said upright supports in fixed horizontally aligned pairs at vertically spaced apart levels in said clearway, each connection including an upwardly projecting hook lanced from the body of the upright support, and a wing on said rail along the edge of the rail facing the upright supports to which the rail is to be secured, and an opening in the wing in which said hook is accepted, said upright support being offset from said clearway along the border of the area vacated by the hook to define a recess, and said wing being offset in an area above said opening to provide a pocket complementary to the recess associated with the hook accepted by said opening and thereby maintaining the hook inside the confines of a plane flush with the clearway side of the wing.

2. In a merchandise storage rack assembly according to claim 1, wherein means are provided for preventing upward withdrawal of said rail from an operatively connected position on said upright support and said means includes a projection on the clearway side of said upright support with which the upper edge of the wing of said rail is engaged when the rail is in said operatively connected position.

3. In a merchandise storage rack assembly according to claim 1, wherein each upright support of the front frame section has a second row of upwardly projecting hooks lanced from a web coextensive in length with said support and facing frontward of said front frame section, said web being offset in a direction away from said clearway relative to the portion of the support containing the hooks facing the clearway side of said support, and a supplementary guide rail secured to each series of horizontally aligned hooks on said web portions of the supports of the front frame section.

4. In a merchandise storage rack installation, a pair of storage rack assemblies, each having front and rear skeleton frame elements arranged in spaced apart relation to provide an open ended clearway therebetween, said front frame element of said rack assemblies defining an aisle therebetween, each frame element including fixed upright supports spaced apart along lines at opposite sides of said clearway, a series of rails coextensive in length to the length of said clearway, and a series of connections operatively securing said rails on said upright supports in fixed horizontally aligned pairs at vertically spaced apart levels on said clearway, each connection including an upwardly projecting hook lanced from the body of the upright post and a wing on said rail along the edge of the rail facing the upright post to which said rail is to be secured, an opening in said wing in which said hook is accepted, said upright support being offset from said clearway above and along opposite sides of the area vacated by the hook to define a recess, said wing being offset in an area above said opening to provide a pocket complementary to the recess associated with the hook accepted by said opening and thereby maintaining the clearway side of said hook inside the confines of a plane flush with the corresponding surfaces of the wing surrounding said hook, each upright support of the front frame member of each rack unit having a web portion coextensive in length with said support and a second row of hooks lanced from said web and facing frontward of each of said upright supports of the front frame member of said rack units, said second row of hooks on the supports being horizontally aligned at selected levels, and supplementary guide rails secured to the frontward facing sides of said upright supports of the front frame elements of said rack units via wings on said guide rails having openings accepting horizontally aligned series of said second row of hooks on the supports of a selected front frame element.

5. In a merchandise storage rack assembly according to claim 1, wherein means are provided for rigidly interconnecting said front and rear frame elements, and said means include transverse bridging members having end portions removably seated in openings provided in said upright supports, each of said bridging members having upward engagement with the undersurface of a guide rail secured to the upright support in which said bridging member is seated to prevent withdrawal of said bridging member from a seated position.

*6. In a merchandise storage rack assembly, front and rear skeleton frame elements arranged in spaced apart parallel relation to provide an open ended clearway therebetween, each frame element including fixed upright supports spaced apart along lines at opposite sides of said clearway, a series of guide rails coextensive in length to the length of said clearway, and a series of connections operatively securing said rails on said upright supports in fixed horizontally aligned pairs at vertically spaced apart*

*levels in said clearway, said connections including an upwardly projecting hook lanced from the body of the upright support, and a wing on said rail along the edge of the rail facing the upright supports to which the rail is to be secured, and an opening in the wing in which said hook is accepted, a recess associated with said hook, said recess being defined by an open area in said upright support above and along side the borders of said hook, and said wing being offset in an area above said opening to provide a pocket complementary to the recess associated with the hook accepted by said opening and thereby maintaining the hook inside the confines of a plane flush with the clearway side of the wing.*

References Cited by the Examiner

The following references, cited by the Examiner, are of record in the patented file of this patent or the original patent.

UNITED STATES PATENTS

| | | | |
|---|---|---|---|
| 751,466 | 2/1904 | Colling | 211—162 |
| 1,601,990 | 10/1926 | Wann | 296—3 |
| 2,776,030 | 1/1957 | Bush | 189—36 |
| 2,875,902 | 3/1959 | Ayars | 211—13 |
| 2,891,757 | 6/1959 | Lang | 248—224 |
| 3,112,034 | 11/1963 | Kaufman et al. | 211—148 |

FOREIGN PATENTS

| | | |
|---|---|---|
| 216,317 | 11/1956 | Australia. |
| 312,115 | 2/1956 | Switzerland. |

CLAUDE A. LE ROY *Primary Examiner.*

WILLIAM D. LOULAN, *Assistant Examiner.*